United States Patent [19]

Pillerel

[11] Patent Number: 4,916,347

[45] Date of Patent: Apr. 10, 1990

[54] BRUSH-HOLDER PLATE IN PARTICULAR FOR AN ELECTRIC MOTOR

[75] Inventor: Alain Pillerel, Audincourt, France

[73] Assignee: ECIA - Equipements Et Composants Pour L'Industrie Automobile, Audincourt, France

[21] Appl. No.: 194,373

[22] Filed: May 16, 1988

[30] Foreign Application Priority Data

May 21, 1987 [FR] France ............................ 87 07132

[51] Int. Cl.$^4$ ............................................ H02K 13/00
[52] U.S. Cl. ..................................... 310/239; 310/42; 310/242
[58] Field of Search ............... 310/229, 230, 239, 240, 310/241, 242, 244, 245, 246, 247, 248, 233, 42; 29/597

[56] References Cited

U.S. PATENT DOCUMENTS

| | | | |
|---|---|---|---|
| 3,242,362 | 3/1966 | Ciliax | 310/240 |
| 3,716,735 | 2/1973 | Dippold | 310/219 |
| 4,293,789 | 10/1981 | King | 310/239 |
| 4,498,230 | 2/1985 | Harris | 310/242 |
| 4,516,047 | 5/1985 | Duverger | 310/240 |
| 4,596,941 | 6/1986 | Kluck | 310/239 |
| 4,694,214 | 9/1987 | Steward | 310/239 |

FOREIGN PATENT DOCUMENTS

| | | |
|---|---|---|
| 3328683 | 2/1985 | Fed. Rep. of Germany . |
| 2094561 | 9/1982 | United Kingdom ................ 310/242 |

Primary Examiner—R. Skudy
Attorney, Agent, or Firm—Sughrue, Mion, Zinn, Macpeak & Seas

[57] ABSTRACT

Brush-holder plate, for mounting brush holders so that radially inwardly spring-biased brushes are locked in a radially outwardly retracted position to permit axial insertion of a commutator during the assembly of an electric motor. The plate has a first portion (1), for supporting brush holders (2, 3), and a retractable locking device for locking the brushes (12, 13) in the retracted position in the brush holders (2, 3). The locking device (4) includes a locking member (10) having branches (8, 9) extending through corresponding orifices (21, 22) of a second portion (6) of the brush-holder plate axially offset relative to the first portion (1). The branches (8, 9) extend, on one hand, at least partly in confronting relation to the brush holders (2, 3) for locking the brushes (12, 13) in the radially retracted position and, on the other hand, partly in the axial insertion path of the commutator of the motor for disengaging the locking member (10) from the orifices (21, 22) and releasing the brushes (12, 13) from the retracted position.

14 Claims, 1 Drawing Sheet

BRUSH-HOLDER PLATE IN PARTICULAR FOR AN ELECTRIC MOTOR

BACKGROUND OF THE INVENTION

The present invention relates to a brush-holder plate, in particular for an electric motor of the type comprising a first portion supporting brush holders and retractable means for locking the brushes in a radially retracted position in the brush holders for the mounting of the latter on the commutator of the motor.

At the present time, all electric motors, and in particular DC motors, intended to be mounted on motor vehicles are, or will be, mounted automatically in production lines.

In this field, conventional practice has established a rule which amounts to assembling or stacking everything along a single direction parallel to the axis of rotation of the armature of the motor. However, the brushes which are adapted to supply the electric current to the commutator of the armature of the motor, are moved in a radial plane perpendicular to the rotation axis of the armature. It is recalled that the brushes, each of which is disposed in a tubular sheath which is also usually termed a "brush holder", are subjected to a force which is therefore perpendicular to the axis of the armature and is exerted by elastic means, such as springs, in the radially inwardly direction toward the commutator for ensuring a pressure of contact compatible with a good passage of the current and therefore with a minimum resistance between the brushes and the rotating commutator.

While it is relatively easy to mount the brushes and the springs in the brush holders in an automatic manner, it is practically impossible, or at least too delicate and costly in equipment, to design a system which spreads apart the brushes (i.e, pushes the brushes against the spring-bias and into a retracted position within the holders) when the commutator of the motor is introduced between the brushes during insertion of the commutator.

A certain number of brush-holder plates exist in the art which are equipped with means for locking the brushes in the retracted position when mounting the plate on the commutator. These locking means are for example formed by washers or portions of a tube pushed by the commutator upon assembly. However, these devices have a number of drawbacks in that they are relatively expensive and mostly cannot be recovered.

SUMMARY OF THE INVENTION

An object of the invention is therefore to overcome these problems by proposing a brush-holder plate which comprises locking means which locks the brushes in the retracted position when mounting the plate on the commutator, which is simple, reliable, cheap, and permits the recovery of the locking means, for example for its re-use.

The invention therefore provides a brush-holder plate, in particular for an electric motor, of the type comprising a first brush-holder support portion and retractable means for locking the brushes in the retracted position in the brush holders for the mounting of the latter on the commutator of motor, wherein the brush locking means comprise a locking member having branches extending through corresponding openings in a second portion of the brush-holder plate, which are axially offset relative to the first portion, said branches extending, on one hand, at least partly in confronting relation to the brush holders for locking the brushes in the retracted position and, on the other hand, partly in the path of insertion of the commutator of the motor for disengaging locking member from the orifices and releasing the brushes in the assembled state of the plate and commutator.

According to another feature, the section of the branches of the locking member is so determined that the brushes bearing against these branches are sufficiently (i.e. retracted into the brush holders) spread apart to permit the insertion of the commutator, and so that a part of this section of the branches extends into the insertion path of the commutator.

A better understanding of the invention will be had from the following description which is given solely by way of example with reference to the accompanying drawing, in which:

DETAILED DESCRIPTION OF A PREFERRED EMBODIMENT

Figure 1:
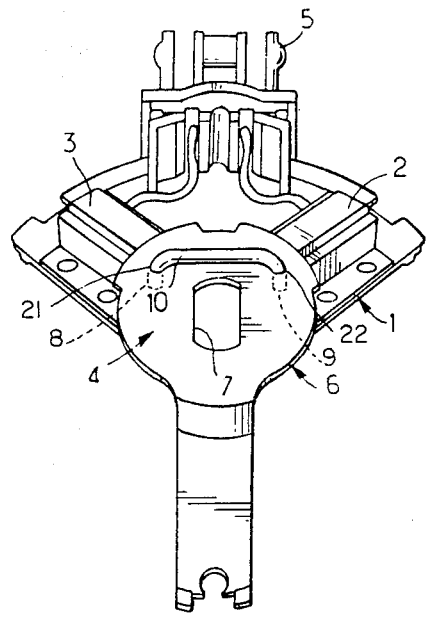
FIG. 1 is a top perspective view of a brush-holder plate according to the invention.
Figure 2:
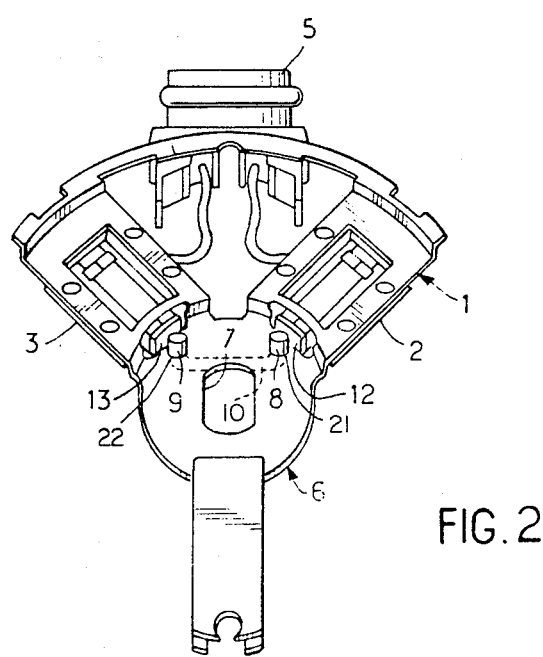
FIG. 2 is a bottom perspective view of a brush-holder plate according to the invention.

As can be seen in FIGS. 1 and 2, a brush-holder plate according to the invention comprises in the known manner a first portion 1 for supporting the brush holders 2 and 3 and radially retractable locking means 4 for locking the brushes in the retracted position in the brush holders 2 and 3 during mounting of the latter on the commutator of the motor.

The brush-holder plate according to the invention further comprises a connector 5 for supplying current to the brushes from outside the motor.

As can be seen in these Figures, this first portion 1 of the brush-holder plate has the general shape of a Y on the two branches of which the brush holders 2 and 3 are fixed, the third branch constituting positioning and centering means for the plate on the rest of the motor electric.

Figure 3:
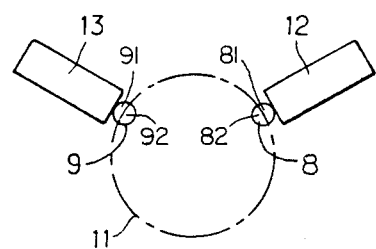
FIG. 3 illustrates the mounting of a brush-holder plate according to the invention on a commutator of an electric motor.

As represented, the brush-holder plate according to the invention comprises a second portion 6 which is axially offset (in the direction of insertion of a commutator, as shown in FIG. 2) from the first portion 1 and has a small central opening 7 for receiving a guide bearing of the rotary shaft of the larger commutator-carrying armature of the motor; as can be seen from FIGS. 1-3, opening 7 has a radial dimension smaller than that of commutator 11. This second portion 6 of the brush-holder plate also includes two orifices 21, 22 into which extend branches 8 and 9 of a U-shaped locking member 10 (as shown in FIGS. 1 and 2) constituting the locking means 4 for locking the brushes in the radially retracted position.

As can be seen more particularly in FIGS. 2 and 3, the branches 8 and 9 of the locking member 10 extend, on one hand, in an axial direction to protrude at least partly in front (see FIG. 2) of the brush holders 2 and 3 (for a distance less than the axial height of the brushes 12, 13) for locking the brushes 12, 13 in the radially retracted position within the holders and, on the other hand, partly in the axial insertion path of movement of the commutator 11 (FIG. 3) of the motor for radially releasing the brushes in the assembled state of the plate commutator.

The section (i.e. a cross-section taken along a plane parallel to the radially inward directions in which the brushes are biased) of the branches 8 and 9 of the locking member 10 is so arranged that the brushes 12 and 13 (FIG. 3) bearing on one section part 81, 91 of these branches are held sufficiently retracted in the brush holders 2, 3 to permit the passage insertion of the commutator 11 of the motor, and that another selection part 82, 92 of this section extends into the path of movement of the commutator for disengaging the locking member (10) from the orifices 21, 22 and releasing the brushes so that they are urged by the brush springs into contact with the commutator 11.

Advantageously, the branches of the locking member 10 have a circular section.

It will be understood that other embodiments may be envisaged.

Thus, for example, the branches of the locking member may have a section other than the circular section shown in the Figures. Moreover, although there has been shown a brush-holder plate having two brushes and a locking member 10 having two branches, it will be understood that a brush-holder plate having some other number of brushes may also be envisaged.

Thus, the brush-holder plate may have four brushes and a second portion having four orifices in which four branches of a locking member are engaged.

The locking member 10 may easily be recovered after disengagement from orifices 21, 22, and it is therefore no longer liable to hinder the remaining assembly of the motor and the operation of the latter. Moreover, the locking member 10 may also be re-used after it is recovered.

I claim:

1. A brush-holder plate for an electric motor of the type having brush-holders containing radially inwardly biased brushes and a commutator having an axis of rotation, said plate comprising a first brush-holder support portion (1) for mounting the brush holders on the commutator, and retractable locking means (4) for locking the brushes in a radially outwardly retracted position in the brush holders during the mounting of the brush-holders on the commutator, said locking means (4) comprising a second portion (6) of the brush-holder plate axially offset relative to said first portion and defining orifices (21, 22), a locking member (10) comprising branches (8, 9) extending axially into said orifices and at least partly in confronting relation to the brush-holders for locking the brushes in the radially retracted position, and also extending partly in an axial insertion path of said commutator for releasing the brushes when the plate and commutator are in an assembled state.

2. A brush-holder plate according to claim 1, wherein the branches of the locking member have a section such that the brushes bearing against said branches are held sufficiently retracted thereby to permit passage of the commutator along said axial insertion path, and, wherein a part of said section of the branches extends into said axial insertion path of the commutator.

3. A brush-holder plate according to claim 2, wherein the branches of the locking member have a circular sectional shape.

4. A brush-holder plate according to claim 2, wherein the second portion of the brush-holder plate has a central opening having a radial dimension smaller than that of the commutator to be inserted.

5. A brush-holder plate according to claim 2, wherein said branches (8, 9) are located such that they are contacted and pushed by insertion of said commutator (11) so that said locking member (10) is axially pushed out of said orifices.

6. A brush-holder plate for an electric motor of the type having a commutator and an axis of rotation, said plate comprising:
a first plate portion for supporting a plurality of brush-holders slidingly receiving a like plurality of corresponding brushes biased in radially inward directions toward the commutator;
a second plate portion axially offset relative to said first plate portion and having a like plurality of orifices (21, 22), located adjacent respective brush holders, for receiving a retractable locking member; and
said retractable locking member (10) having a like plurality of branches (8, 9) which correspond to said plurality of brush-holders, which are engaged in respective ones of said orifices and which are movable between: a first position wherein each of said branches extends, on one hand, at least partly in confronting relation to its corresponding brush-holder for contacting and locking its corresponding brush, against the inwardly directed bias, in a radially outwardly retracted position out of said axial insertion path along which said commutator is to be inserted and, on the other hand, partly in an axial insertion path of the commutator; and a second position where said branches, themselves, are retracted out of contact with said brushes for releasing the biased brushes for radially inward movement into contact with said commutator upon insertion.

7. A brush-holder plate according to claim 6, wherein each of said branches of the locking member comprises a first section part against which the brushes bear and are held sufficiently retracted to permit the insertion of the commutator along said axial insertion path.

8. A brush-holder plate according to claim 6, wherein the branches of the locking member have a circular section.

9. A brush-holder plate according to claim 6, wherein said locking member (10) is U-shaped, and said branches are bent parts of the locking member which protrude toward said commutator through said orifices from a side of said second portion opposite to that on which the remainder of said locking member is located.

10. A brush-holder plate according to claim 7, wherein said locking member (10) is U-shaped, and said branches are bent parts of the locking member which protrude toward said commutator through said orifices from a side of said second portion opposite to that on which the remainder of said locking member is located.

11. A brush-holder plate according to claim 9, wherein said second plate portion is axially offset in the direction of insertion of the commutator, and wherein said branches protrude from said side for an axial distance which is less than the axial height of said brushes.

12. A brush-holder plate according to claim 7, wherein said each of said branches (8, 9) of the locking member (10) also comprises a second section part (82, 92) which extends into the insertion path of the commutator (11), said first and second section parts corresponding to a cross-section taken along a plane parallel to said radially inward directions in which the brushes are biased.

13. A brush-holder plate according to claim 12, wherein said second section part (82, 92) of said each of said branches (8, 9) is located to be contacted and pushed by an inserted commutator (11) so that the locking member (10) is pushed out of contact with the brushes (2, 3) to release the brushes for radially inward movement from their retracted position toward said commutator (11) when said plate and commutator are assembled.

14. A brush-holder plate according to claim 12, wherein the second plate portion (6) of the brush-holder plate has a central opening (7) having a radial dimension smaller than that of the commutator (11).

* * * * *